UNITED STATES PATENT OFFICE.

JAMES BURLINGAME ALBACH, OF ST. LOUIS, MISSOURI; CLARENCE I. ALBACH ADMINISTRATOR OF SAID JAMES B. ALBACH, DECEASED.

FLAVORING EXTRACT AND PROCESS OF PREPARING THE SAME.

1,403,473. Specification of Letters Patent. Patented Jan. 17, 1922.

No Drawing. Application filed May 24, 1918. Serial No. 236,368.

*To all whom it may concern:*

Be it known that I, JAMES B. ALBACH, a citizen of the United States, residing at St. Louis, in the county of St. Louis City and State of Missouri, have invented new and useful Improvements in Flavoring Extracts and Processes of Preparing the Same, of which the following is a specification.

My present invention has to do more particularly with extracts for flavoring purposes; and it consists in the process and in the product hereinafter described and definitely set forth in my appended claims.

The object of my invention is to produce a product of great strength and lasting flavor which is susceptible of being reduced in strength if necessary or desirable by the addition of water or other available diluent.

The invention also contemplates the attainment of a large yield from flavoring material and the production of a finished product containing no alcohol. Alcohol, as is well known, is a good solvent but it contributes nothing to the flavor of an essence, flavoring extract or tincture. Furthermore, because of its high volatile character it is likely to evaporate when used in cooking or baking or be otherwise eliminated at a low temperature and incidental thereto it carries with it certain principles of the material that it has extracted, and when this occurs the flavor is necessarily weakened and lacking in the finished product in which it is used.

My invention is applicable to the manufacture of essence, tinctures, and extracts from flavoring material of all kinds and especially vanilla beans, lemon, peppermint, orange, strawberry, pineapple, banana, cherry, and cinnamon.

An important characteristic of my process is that it involves the use of substance having soluble preservative and binder capacities, and requires a high temperature to vaporize so that all the flavoring principles are maintained in solution and retained.

My process specifically involves the use of liquid invert sugar, whereby a superior extract, essence, or tincture is produced.

In carrying out my process I mix one gallon of alcohol, and seven pints of water and to said mixture I add about one pound of oleoresin vanilla. This mixture is thoroughly agitated at intervals during about six hours, and the compound is permitted to stand about 48 hours or for a longer period if feasible, and is then filtered through any suitable agent such as the ordinary well known filter paper.

In the manner set forth in the foregoing alcoholic vanilla extract is produced, and to about two gallons of the said extract I add about one and three-fourths gallons of liquid invert sugar. This composition I mix while applying a low degree of heat, and it is then let stand about 24 hours. It is then placed in a vacuum still or fractional distilling apparatus for the recovery of alcohol; the distillation and evaporization being continued until the product is reduced to approximately two gallons liquid measure. The product is then allowed to cool after which it is ready for use.

Manifestly the product of my process is especially strong, but this offers no disadvantage inasmuch as the product is susceptible of being readily reduced in strength by the addition of water or other simple diluent.

I would also have it understood at this point that in the distillation described in the foregoing the temperature of the still should be so regulated as to never rise above 125° F.

In the specific process set forth I include the oleoresin vanilla because this specific ingredient assures a constant content of the soluble matters—resin, etc., in the finished product. The oleoresin vanilla is also preferable from the standpoint of economy since ordinarily said ingredient is produced in plants that handle the vanilla beans in very large quantities.

While I describe the oleoresin vanilla specifically it is to be understood that by the practice of my process involving the use of invert sugar, other flavoring principles can be extracted, and essences, tinctures, and extracts may be produced by substituting the oil or oleoresin or fruit juice of the respective materials, such as lemon, orange, almond, cherry, etc.

Experience has demonstrated that the product afforded by my process is non-fermentative; is not liable to crystallize, and is adapted to keep for an indefinite period in any climate.

It will also be appreciated that in addition to serving as a carrier for the flavoring principles the invert sugar operates as a soluble emulsifier, and is calculated to strongly accentuate or intensify the flavoring principle or principles present. My product is further advantageous because of its adaptability to mix readily with syrup or other aqueous mixtures.

Having described my invention what I claim and desire to secure by Letters-Patent is:

1. The process of producing a flavoring extract which consists in first producing an alcoholic extract of a flavoring ingredient, adding thereto a substantially equal part of a flavorless, soluble, heavy liquid of relatively low volatility, mixing the whole while subjected to a low degree of heat approximating and not exceeding 125° Fahrenheit, allowing the mixture to stand, and then removing the alcohol from the mixture and reducing the remaining product to substantially the same quantity as that of the original alcoholic extract.

2. The herein described flavoring extract comprising a flavoring ingredient and a soluble, heavy liquid carrier and binder without a distinctive flavor in itself but being of relatively low volatility and non-crystallizable.

3. A flavoring extract comprising a flavoring ingredient and a carrier and binder of liquid invert sugar of heavy consistency and without distinctive flavor of its own.

In testimony whereof I affix my signature.

JAMES BURLINGAME ALBACH.